Sept. 28, 1965 J. BOEHM 3,208,293
LOW INERTIA ACTUATOR
Filed Oct. 14, 1960 5 Sheets-Sheet 4

Josef Boehm
INVENTOR.

BY S. J. Rotondi
A. T. Dupont
Jack W. Voigt

United States Patent Office 3,208,293
Patented Sept. 28, 1965

3,208,293
LOW INERTIA ACTUATOR
Josef Boehm, Huntsville, Ala., assignor to the United States of America as represented by the Secretary of the Army
Filed Oct. 14, 1960, Ser. No. 62,808
3 Claims. (Cl. 74—89)
(Granted under Title 35, U.S. Code (1952), sec. 266)

The invention described herein may be manufactured and used by or for the Government for governmental purposes without the payment of any royalty thereon.

This invention relates to a low inertia actuator. Such an actuator may be used with servo systems for actuating control surfaces, such as rudders in airplanes, and/or vanes in guided missiles.

When such a device is used in controlling missiles or planes it should inherently have a great reduction ratio for the purpose of increasing the input torques. Along with the ratio requirement, the device should be characterized by minimum inertia for dynamical requirements and by minimum weight, and compact configuration for a given output torque.

In view of these facts, an object of this invention is to provide an actuator with a very high reduction ratio between the input and the output revolutions-per-minute, so as to produce a large output torque.

Another object of the invention is to maintain minimum weight and dimensions.

A further object of the invention is to establish minimum inertia of the moving parts in the actuator for a given output torque.

The foregoing and other objects of this invention will become more fully apparent from the following detailed description and from the accompanying drawings, in which.

Figure 1:
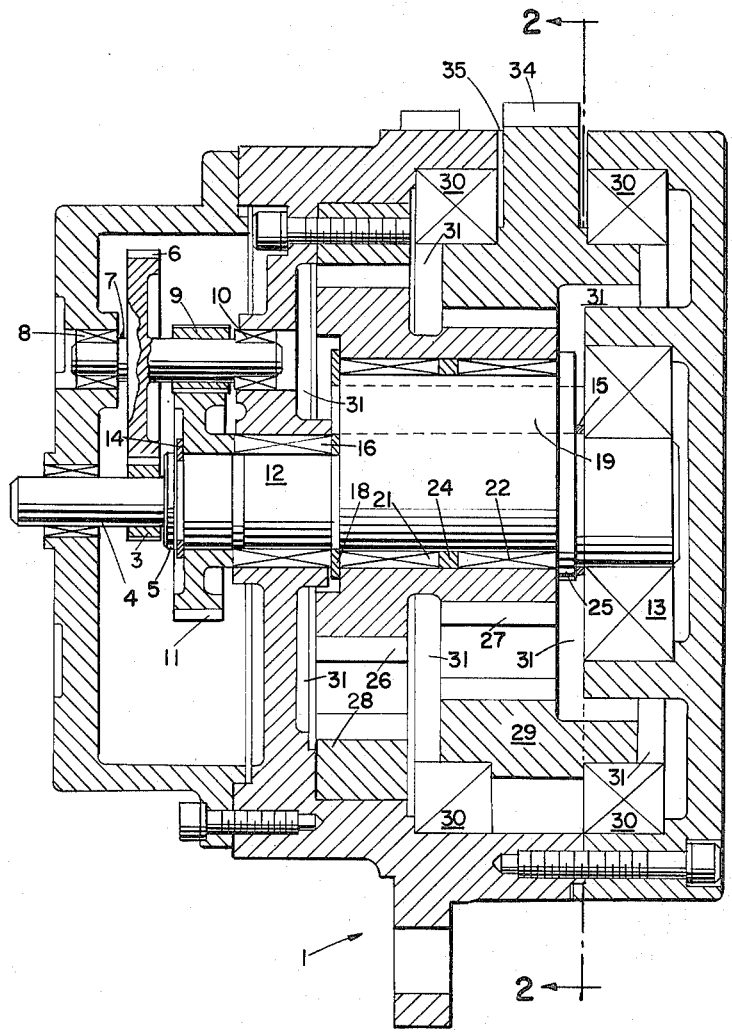
FIGURE 1 is a sectional view of an embodiment of the invention.
Figure 2:
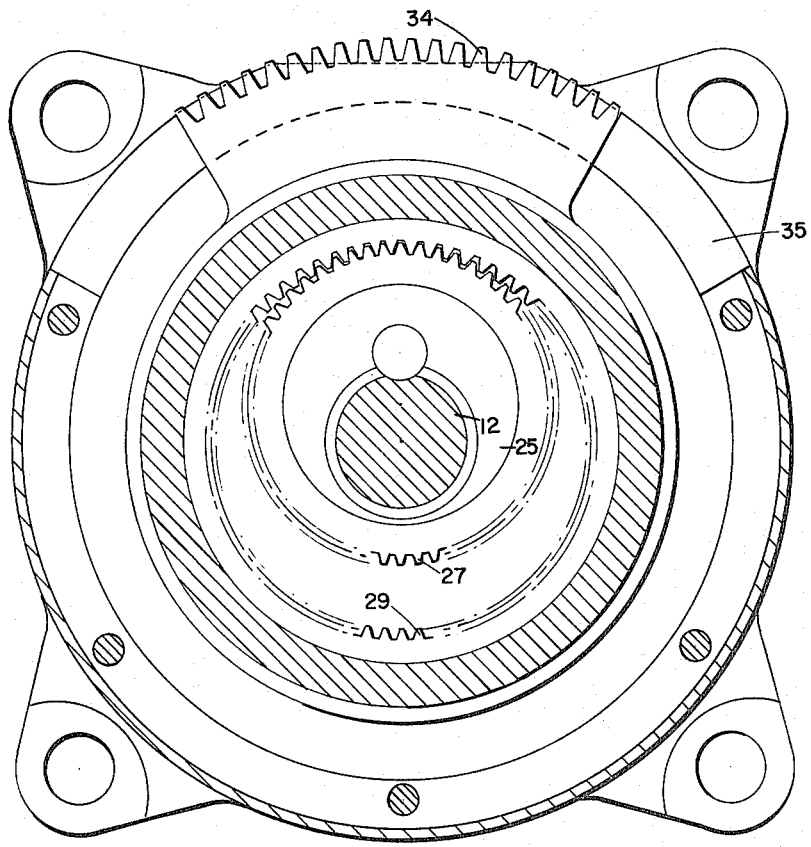
FIGURE 2 is a sectional view taken from the plane of line 2—2 of FIGURE 1.
Figure 3:
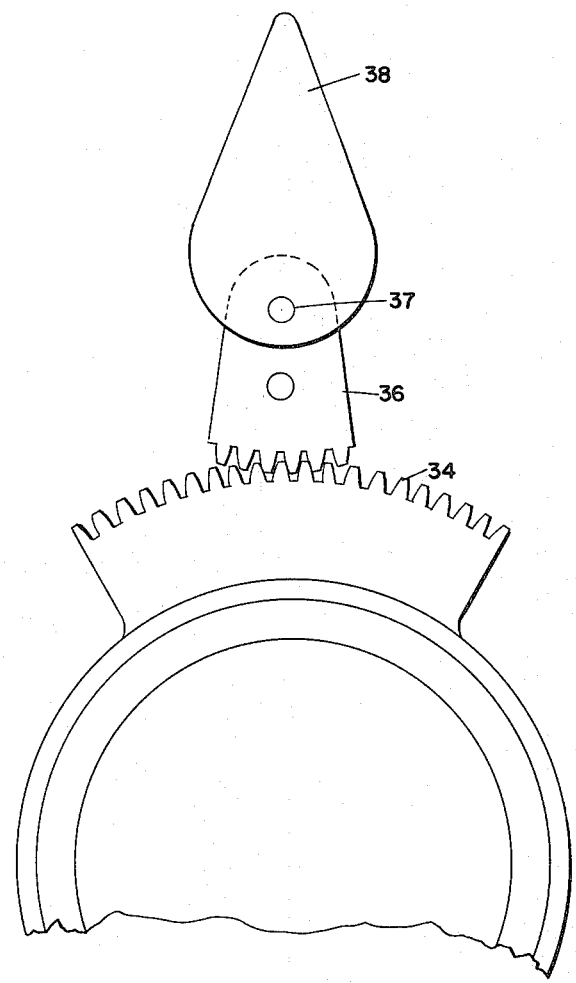
FIGURE 3 is a view showing the embodiment of FIGURE 1 connected to a missile vane.
Figure 4:
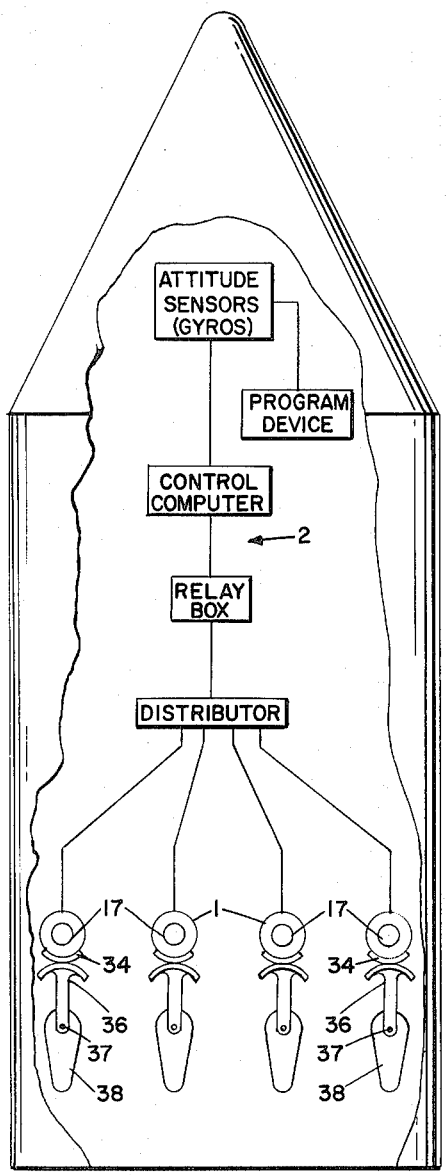
FIGURE 4 is a diagrammatic view of a missile body provided with a block diagram, showing the connections between the programming means, the actuator of FIGURES 1–4 and the missile vanes.

In the drawings, wherein for the purpose of illustration there are shown different embodiments of the invention and particularly in FIGURES 1, 2 and 4, the numeral 1 designates a sectional housing for an actuator.

The actuator receives an input torque from a servo motor 17 (FIGURE 4). The servo motor, to be actuated, is determined by a guidance system 2, which controls the signal applied to the servo motor or motors 17.

The torque is applied to a pinion gear 3. The gear is integrally connected to a shaft 4 which is journaled in bearing 5, positioned inside housing 1. The teeth of gear 3 are in driving mesh with the teeth of gear 6.

Gear 6 is secured to one end of a shaft 7, which is journaled in bearing 8. The other end of shaft 7 has a second pinion gear 9 secured to it. This end, of shaft 7, is also journaled in a bearing 10.

The teeth of gear 9 are in driving mesh with the teeth of a gear 11, whose axis coincides with the axis of gear 3. Gear 11 is secured to one end of a shaft 12 by screw threads or similar means. Shaft 12 is provided with an eccentric 19 fixed or formed thereon. The side of gear 11 that faces gear 3 is abutted by a retainer ring 14 which aligns the teeth of gears 9 and 11. The other side of gear 11 serves as part of a retainer for bearings 16, which provides a journal for the above end of shaft 12. The other end of shaft 12 is journaled in bearing 13, which also helps align shaft 12 by abutting flange 15.

The other part of the retainer for bearings 16 is provided by plate 18, which is attached to the eccentric 19 of shaft 12 by screws (not shown). Plate 18 also serves as a retainer for section 21 of a double bearing, which is fitted around the periphery of the eccentric 19. Bearing section 21 is separated from a second bearing section 22 by a member 24. The other end of section 22 abuts a retaining flange 25, formed on the other end of eccentric 19.

Flange 25, separation member 24, bearing sections 21 and 22 and plate 18 cooperate in securing and aligning a pair of integrally connected gears 26 and 27 with a stationary gear 28 and a movable gear 29, respectively. Gears 28 and 29 have internal teeth. Movable gear 29 is journaled in bearings 30 and receives its rate of rotational movement from the difference in the number of teeth between it and gear 27.

Gears 26–29 and bearings 10, 13, 16, 21, 22 and 30 are lubricated by oil distribution channels 31, which are arranged throughout sectional housing 1.

The movement of movable gear 29, referred to above, is transmitted by an external gear section 34, which is integrally connected to gear 29, to the teeth of a pivoted member 36. Gear section 34 is fitted in a slot 35, formed between two sections of housing 1. Member 36 transmits the movement through a connecting arm 37 to a vane or rudder 38.

The operation of this embodiment is as follows:

The actuator is connected to the control surfaces of a vehicle and to a means of applying control, such as a guidance and/or control system 2, shown in FIGURE 4. The control means determines the proper signal and sends it to the correct servo motor or motors 17. The motor or motors apply torque to the spur gear arrangement where it is increased and applied to shaft 12.

Shaft 12 receives the increased torque and applies it to the planetary gear group. Gears 26 and 27 of this group, which are rigidly connected, are movably mounted on bearings sections 21 and 22, which cover the periphery of shaft 12. When shaft 12 is rotated, eccentric 19 moves a section of teeth of gears 26 and 27 into mesh with a section of teeth of stationary gear 28 and movable gear 29, respectively.

As the sections are moved into mesh by rotation of shaft 12, gears 26 and 27 will be rotated in an opposite direction from shaft 12.

This rotation will increase the torque applied to the planetary system and give a very high output torque at section 34, due to the difference in the number of teeth on gears 27 and 29. For example, if gear 27 has 99 teeth and gear 29 has 100 teeth, every revolution of gear 29 would revolve gear 27, $\frac{1}{100}$ of a revolution. This movement of gear 29 would cause the rudder or vane attached to arm 37 and member 36 to have very little movement. A ratio of the spur gears to the planetary gears must also be utilized, which will provide minimum inertia. It is apparent, therefore, that by providing a spur reduction gearing intermediate a driving motor's output shaft and a planetary gear unit having only two pairs of meshing gears, and by providing a predetermined ratio between the speed reduction gearing and planetary gearing there is provided an actuator having high output torques with negligible inertia.

Figure 6:
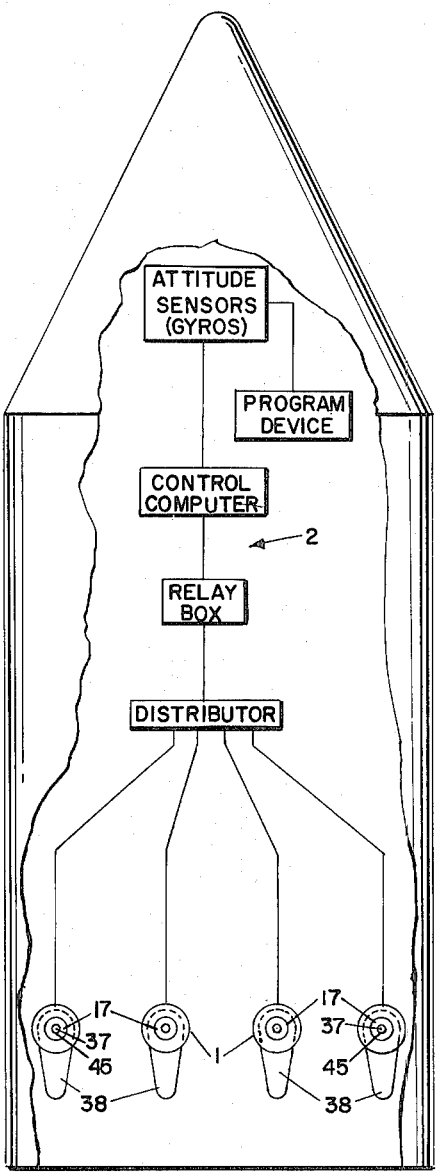
FIGURE 6 is a diagrammatic view similar to FIGURE 4, showing the embodiment of the actuator of FIGURE 5 connected between the programming means and the missile vanes.
Figure 5:
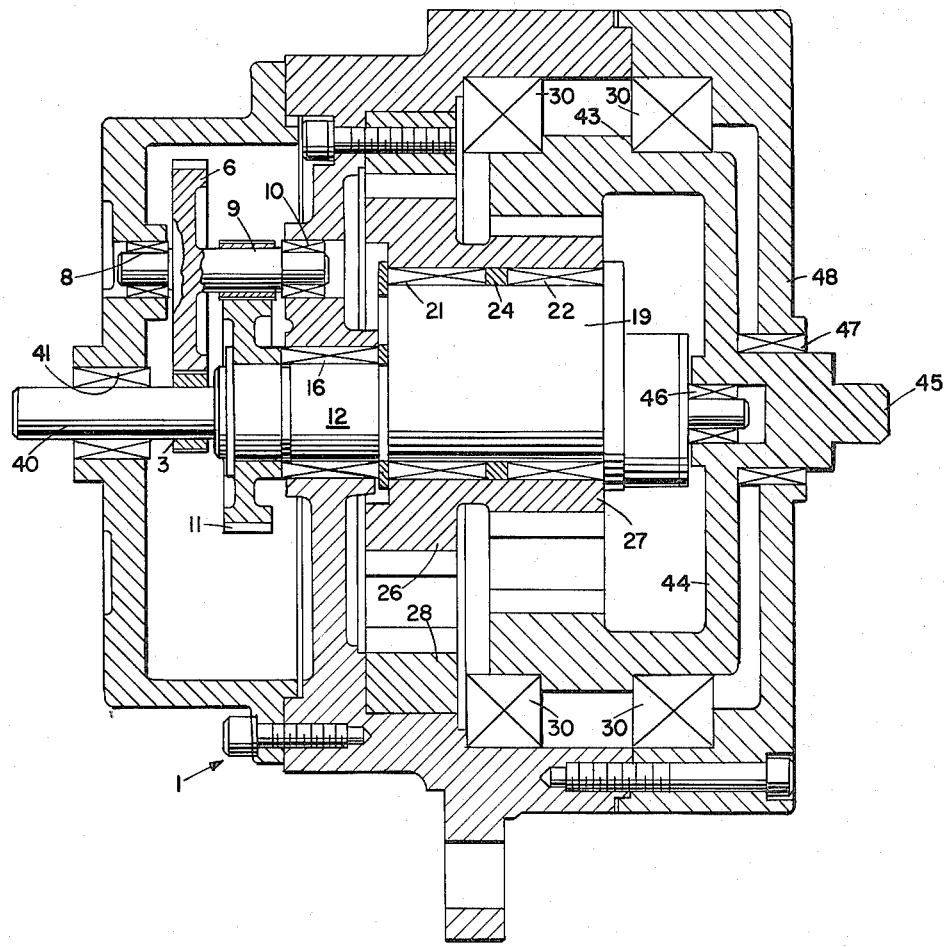
FIGURE 5 is an elevational sectional view of another embodiment of the invention.

In the embodiment shown in FIGURES 5 and 6, components common to both embodiments have the same reference numeral.

This embodiment receives its control signal from the same type of control means shown in FIGURE 5. This control signal is fed to the proper servo motor or motors, where it is changed into torque and applied to the motor shaft 40. Shaft 40 is journaled in bearing 41, which is fitted in housing 1.

The end of shaft 40 opposite from the servo motor is secured to pinion 3.

The arrangement of the remainder of the embodiment is the same except the output gear 43, the output means and the end of shaft 12 near the output gear.

Output gear 43 is arranged for rotation by gear 27 in the same manner as gear 29, but contains a different output arrangement. The gear is shaped in the form of a cup with internal teeth to mesh with gear 27. Like gear 29, gear 43 is journaled in bearings 30. The outer portion 44 of gear 43 contains an output shaft 45 integrally connected to its center and journaled in a bearing 47 in fixed mount 48.

Output shaft 45 contains a central bore, provided with a bearing 46, for journaling the end of shaft 12.

Shaft 45 is connected to shaft 49 for movement of the control surface 38 thru the connecting arm arrangement 37.

The operation of this embodiment is the same as the operation of the embodiment shown in FIGURES 1–4.

It is to be understood that the forms of the invention, herein shown and described, are to be taken as preferred embodiments, and that various changes in the shape, size and arrangement of parts may be resorted to, without departing from the spirit of the invention or the scope of the subjoined claims.

The following invention is claimed:

1. An actuator disposed for high output torques and minimum inertia comprising: a sectional housing including first, second, and third sections; means to secure said housing sections together; a first shaft having an eccentric thereon, said shaft having both ends journaled in said housing; a second shaft rotatably secured to said housing and said first shaft; an input pinion gear secured to said second shaft; reversible means drivably connected to said second shaft; means for controlling said reversible means; a second gear in mesh with said pinion gear; a third shaft having said second gear secured to it, said third shaft having one end journaled in said first section of said housing and the other end journaled in said second section of said housing; a third gear secured to said third shaft between said second gear and said journal in said second section of said housing; a fourth gear secured to the same end of said first shaft as said second shaft and meshed with said third gear; a fixed gear, provided with internal teeth, secured to said second section of said housing; a movable gear, journaled partly in said second section and partly in said third section of said housing, said movable gear having internal teeth and a section of external teeth, said external teeth being adapted to fit a slot formed between said last-named sections of said housing; a pair of integrally connected gears journaled for rotation on said eccentric of said first shaft, said pair of gears adapted to mesh with said stationary gear and said movable gear, said pair of gears being provided with a smaller number of teeth than the gears with which they mesh; a pivoted member having a section of gear teeth meshed with said external teeth section of said movable gear.

2. An actuator disposed for high output torques and minimum inertia comprising: a housing provided with a slot in its outer surface, near one end; a first shaft having an eccentric thereon, said shaft journaled in said housing; a second shaft rotatably secured in said housing, said second shaft having an input gear rotatably secured thereto; reversible drive means connected to said input gear; means for controlling said drive means; a second and third gear secured to a movable third shaft, said movable third shaft being secured in said housing, said second gear adapted to mesh with said input gear; a fourth gear secured to said first shaft and meshed with said third gear; a fixed gear, having internal teeth, secured to said housing; a movable gear having internal teeth, and a section of external teeth adapted to fit said slot in said housing, said movable gear being rotatably secured in said housing; a pair of integral gears rotatably secured on said eccentric of said first shaft and meshed with said fixed gear and said movable gear; a pivoted member having gear teeth in mesh with said section of external teeth on said movable gear.

3. An actuator disposed for high output torques and minimum inertia comprising: a housing; a first shaft having an eccentric thereon, said first shaft journaled in said housing for rotation; a second shaft secured in said housing for rotation; an input gear secured to said second shaft for rotation therewith; reversible drive means connected to said input gear; means for controlling said drive means; a second and third gear secured to a third rotatable shaft, said third rotatable shaft being secured in said housing in parallel relation with said first shaft, said second gear adapted to mesh with said input gear; a fourth gear secured to said first shaft and meshed with said third gear; a fixed gear having internal teeth, secured to said housing; a pair of integral gears rotatably secured on said eccentric of said first shaft, one of said pair of integral gears meshed with said fixed gear; a movable cup-shaped member having internal teeth disposed on its inner periphery at the open end thereof, said cup-shaped member having a central bore therein and mounted in said housing in concentric relation with said input gear, said bore disposed to receive one end of said first shaft therein for support of said shaft in coaxial alignment with said input gear, said cup-shaped member provided with a projecting shaft portion having its axis coincident with the axis of said input gear to define a straight line drive, said projecting portion being journaled in said housing and forming the output of said actuator, said internal teeth of said cup-shaped member disposed in meshed relation with the second of said pair of integral gears for rotation thereby.

References Cited by the Examiner

UNITED STATES PATENTS

| 1,674,200 | 6/28 | Gatten | 74—421 |
| 1,873,380 | 8/32 | Gibson | 74—305 |
| 2,168,164 | 8/39 | Kittridge | 74—805 X |
| 2,168,814 | 8/39 | Willgoos | 74—421 |
| 2,184,669 | 12/39 | Harpen | 74—606 |
| 2,250,259 | 7/41 | Foote | 74—805 |
| 2,353,466 | 7/44 | Heintz et al. | 74—606 |
| 2,418,351 | 4/47 | Jackson. | |
| 2,620,391 | 12/52 | King | 74—98 X |
| 2,778,338 | 1/57 | Shafer | 60—52 |
| 2,811,834 | 11/57 | Shafer et al. | 60—52 |
| 2,870,748 | 1/59 | Hemphill | 244—85 |
| 2,911,956 | 11/59 | Smith | 60—52 |
| 2,966,808 | 1/61 | Grudin | 74—805 X |
| 2,981,500 | 4/61 | Carlton | 244—14 |
| 3,030,052 | 4/62 | Grudin | 74—805 X |
| 3,056,315 | 10/62 | Mros | 74—805 |
| 3,074,294 | 1/63 | Wooley | 74—805 X |

FOREIGN PATENTS 899,159 7/49 Germany.

BROUGHTON G. DURHAM, *Primary Examiner.*

CHESTER L. JUSTUS, *Examiner.*